United States Patent
Wang et al.

(10) Patent No.: US 11,451,774 B2
(45) Date of Patent: Sep. 20, 2022

(54) INTRA-PREDICTION-BASED ENCODING AND DECODING METHOD, APPARATUS AND FILTER

(71) Applicant: PEKING UNIVERSITY SHENZHEN GRADUATE SCHOOL, Shenzhen (CN)

(72) Inventors: Ronggang Wang, Shenzhen (CN); Kui Fan, Shenzhen (CN); Guisen Xu, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/610,290

(22) PCT Filed: Mar. 26, 2019

(86) PCT No.: PCT/CN2019/079610
§ 371 (c)(1),
(2) Date: Nov. 1, 2019

(87) PCT Pub. No.: WO2020/181579
PCT Pub. Date: Sep. 17, 2020

(65) Prior Publication Data
US 2021/0400265 A1    Dec. 23, 2021

(30) Foreign Application Priority Data

Mar. 12, 2019   (CN) .......................... 201910182601.1

(51) Int. Cl.
*H04N 19/117*   (2014.01)
*H04N 19/176*   (2014.01)
(Continued)

(52) U.S. Cl.
CPC ......... *H04N 19/117* (2014.11); *H04N 19/105* (2014.11); *H04N 19/159* (2014.11);
(Continued)

(58) Field of Classification Search
CPC .. H04N 19/117; H04N 19/105; H04N 19/159; H04N 19/176; H04N 19/182; H04N 19/46; H04N 19/82
(Continued)

(56) References Cited

U.S. PATENT DOCUMENTS 10,075,734 B2    9/2018  Lee et al.
11,381,812 B2 *  7/2022  Wang ................... H04N 19/147
(Continued)

FOREIGN PATENT DOCUMENTS

| CN | 102939761 A | 2/2013 | |
| CN | 102984523 A | 3/2013 | |
| GB | 2567863 A * | 5/2019 | ............. H04N 19/11 |

*Primary Examiner* — Albert Kir
(74) *Attorney, Agent, or Firm* — Miles & Stockbridge P.C.

(57) ABSTRACT

An embodiment of the present disclosure discloses an intra-prediction-based encoding and decoding method, apparatus and filter, and belongs to a video coding technical field. The method comprises: acquiring reconstructed pixels adjacent to a to-be-predicted prediction block; determining corresponding reconstructed pixels adjacent to the to-be-predicted prediction block among the reconstructed pixels as reference pixels for filtering, based on prediction modes of the to-be-predicted prediction block; based on the reference pixels, using a filter corresponding to prediction modes of the to-be-predicted prediction block to filter interim prediction values of the to-be-predicted prediction block, to obtain new pixel values of the to-be-predicted prediction block, wherein the interim prediction values are obtained based on other intra prediction methods; performing a CLIP operation on the new pixel values of the to-be-predicted prediction (Continued)

block, to obtain a first prediction value of the to-be-predicted prediction block. By the method provided in the specification, the accuracy of intra prediction may be improved, and coding efficiency may be improved.

12 Claims, 4 Drawing Sheets

(51) Int. Cl.
  *H04N 19/82* (2014.01)
  *H04N 19/105* (2014.01)
  *H04N 19/159* (2014.01)
  *H04N 19/182* (2014.01)
  *H04N 19/46* (2014.01)

(52) U.S. Cl.
  CPC ......... *H04N 19/176* (2014.11); *H04N 19/182* (2014.11); *H04N 19/46* (2014.11); *H04N 19/82* (2014.11)

(58) Field of Classification Search
  USPC .................................................. 375/240.02
  See application file for complete search history.

(56) References Cited

U.S. PATENT DOCUMENTS

| | | | |
|---|---|---|---|
| 2008/0166068 A1* | 7/2008 | Fuchigami | G06T 3/4007 382/300 |
| 2011/0200103 A1 | 8/2011 | Kim et al. | |
| 2016/0227222 A1* | 8/2016 | Hu | H04N 19/117 |
| 2019/0141317 A1* | 5/2019 | Heo | H04N 19/105 |
| 2019/0141318 A1* | 5/2019 | Li | H04N 19/159 |
| 2019/0166375 A1* | 5/2019 | Jun | H04N 19/159 |
| 2019/0268594 A1* | 8/2019 | Lim | H04N 19/46 |
| 2020/0021817 A1* | 1/2020 | Van der Auwera | H04N 19/52 |
| 2020/0036985 A1* | 1/2020 | Jang | H04N 19/105 |
| 2020/0137401 A1* | 4/2020 | Kim | H04N 19/86 |
| 2021/0218962 A1* | 7/2021 | Lim | H04N 19/14 |

* cited by examiner

INTRA-PREDICTION-BASED ENCODING AND DECODING METHOD, APPARATUS AND FILTER

CROSS-REFERENCE TO RELATED APPLICATIONS

The present application is a national stage filing under 35 U.S.C. § 371 of PCT/CN2019/079610, filed on Mar. 26, 2019 which claims priority to CN Application No. 201910182601.1 filed on Mar. 12, 2019. The applications are incorporated herein by reference in their entirety.

FIELD

The present disclosure relates to a field of video coding, specifically relates to an intra-prediction-based encoding and decoding method, apparatus and filter.

BACKGROUND

H.264 was brought forward by the International Standards Organization and the International Telecommunications Union as a New Generation of digital video compression format following MPEG4. Since H.264, intra prediction has become a mainstream technique of video coding, and has a significant effect on improving coding performance.

In the prior art, the performance of video coding is limited due to low accuracy of intra prediction technique. To enhance the accuracy of intra prediction, the following two methods are usually used to improve the intra prediction technique. One way is to enhance the accuracy of prediction by using more intra prediction modes, which may greatly increase coding complexity. Another way is to reduce distortion of intra prediction by filtering intra prediction unit, so as to enhance coding efficiency. However, in the prior art, there are still defects in the technique of filtering the intra prediction unit, in one aspect, the filtering technique in the prior art is only applicable to a limited number of specific patterns, and in another aspect, in the filtering technique of the prior art, spatial correlations of the pixels have not been sufficiently utilized to reduce the distortion of prediction.

Therefore, a new intra prediction method is needed to enhance the accuracy of intra prediction and to enhance coding efficiency.

SUMMARY

An embodiment of the specification provides an intra-prediction-based encoding and decoding method, apparatus and filter, to solve the technical problem as follows: be able to improve the accuracy of intra prediction, and to enhance coding efficiency.

To solve the technical problem, an embodiment of the specification is implemented as follows:

An embodiment of the specification provides an intra-prediction-based encoding method, comprising: acquiring reconstructed pixels adjacent to a to-be-predicted prediction block; determining corresponding reconstructed pixels adjacent to the to-be-predicted prediction block among the reconstructed pixels as reference pixels for filtering, based on prediction modes of the to-be-predicted prediction block; based on the reference pixels, using a filter corresponding to prediction modes of the to-be-predicted prediction block to filter interim prediction values of the to-be-predicted prediction block, to derive new pixel values of the to-be-predicted prediction block, wherein the interim prediction values are derived based on other intra prediction methods; performing a CLIP operation on the new pixel values of the to-be-predicted prediction block, to derive a first prediction value of the to-be-predicted prediction block.

Preferably, the method further comprises: comparing the first prediction value of the to-be-predicted prediction block with a second prediction value of the to-be-predicted prediction block derived by the other intra prediction methods, to derive a prediction value of the to-be-predicted prediction block, and to output a flag to the bitstream in which the to-be-predicted prediction block is located, and wherein the second prediction value has been operated by a CLIP operat, and the flag is used to mark whether the to-be-predicted prediction is to be filtered.

Preferably, the acquiring reconstructed pixels adjacent to a to-be-predicted prediction block specifically comprises: decoding the coded intra or inter prediction blocks adjacent to the to-be-predicted prediction block, to derive the reconstructed pixels adjacent to the to-be-predicted prediction block.

Preferably, the determining corresponding reconstructed pixels adjacent to the to-be-predicted prediction block among the reconstructed pixels as reference pixels for filtering, based on prediction modes of the to-be-predicted prediction block specifically comprises: if the first type of prediction modes are used for intra prediction to predict the to-be-predicted prediction block, a column of reconstructed pixels to the left of the to-be-predicted prediction block are used as reference pixels for filtering; if the second type of prediction modes are used for intra prediction to predict the to-be-predicted prediction block, a row of reconstructed pixels above the to-be-predicted prediction block are used as reference pixels for filtering; if the third type of prediction modes are used for intra prediction to predict the to-be-predicted prediction block, a column of reconstructed pixels to the left of the to-be-predicted prediction block and a row of reconstructed pixels above the to-be-predicted prediction block are used as reference pixels for filtering.

Preferably, the filter is a three-tap filter, which is expressed as Formula (1):

$$P(x,y)=(f(x)\cdot T(-1,y)+f(y)\cdot T(x,-1)+(64-f(x)-f(y))\cdot T(x,y)+32)>>6 \quad \text{Formula(1)}$$

wherein P(x, y) is a new pixel value of the to-be-predicted prediction block;

T(x, y) is an interim prediction value of the to-be-predicted prediction block;

T(−1, y) is a reference pixel value to the left of the to-be-predicted prediction block;

T(x, −1) is a reference pixel value above the to-be-predicted prediction block;

X and y are coordinates in the predicted block to be predicted;

x=0 denotes the first column of the to-be-predicted prediction block;

y=0 denotes the first row of the to-be-predicted prediction block;

M denotes the width of the to-be-predicted prediction block;

N denotes the height of the to-be-predicted prediction block;

f(x) denotes a filter coefficient of T(−1, y);

f(y) denotes a filter coefficient of T(x, −1).

Preferably, as for the filter, when f(x) decays to zero, the filter degenerates into a two-tap filter, which is expressed as Formula (2):

$$P(x,y)=(f(y)\cdot T(x,-1)+(64-f(y))\cdot T(x,y)+32)>>6 \quad \text{Formula (2);}$$

when f(y) decays to zero, the filter degenerates into a two-tap filter, which is expressed as Formula (3):

$$P(x,y)=(f(x)\cdot T(-1,y)+(64-f(x))\cdot T(x,y)+32)>>6 \quad \text{Formula (3)}.$$

Preferably, the filter coefficients are expressed as Formulas (4) and (5):

$$f(x)=FS[M][x] \quad \text{Formula (4)}$$

$$f(y)=FS[N][y] \quad \text{Formula (5)}$$

wherein FS are filter coefficients.

Preferably, the based on the reference pixels, using a filter corresponding to the prediction modes of the to-be-predicted prediction block specifically comprises: determining filter coefficients of the reference pixels according to the width and the height of the to-be-predicted prediction block; using a filter corresponding to intra prediction modes of the to-be-predicted prediction block, based on the reference pixels and the filter coefficients.

Preferably, the using a filter corresponding to the prediction modes of the to-be-predicted prediction block to filter interim prediction values of the to-be-predicted prediction block specifically comprises: if a first type of prediction modes are used for intra prediction to predict the to-be-predicted prediction block, a filter of Formula (3) is used to filter the interim prediction values of the to-be-predicted prediction block; if a second type of prediction modes are used for intra prediction to predict the to-be-predicted prediction block, a filter of Formula (2) is used to filter the interim prediction values of the to-be-predicted prediction block; if a third type of prediction modes are used for intra prediction to predict the to-be-predicted prediction block, a filter of Formula (1) is used to filter the interim prediction values of the to-be-predicted prediction block.

Preferably, the CLIP operation is expressed as Formula (6):

$$\text{CLIP}(i, j, x) = \begin{cases} i, & x < i \\ j, & x > j \\ x, & i \le x \le j \end{cases} \quad \text{Formula (6)}$$

wherein, i denotes a lower limit of a defined range, and j denotes an upper limit of the defined range.

Preferably, the flag is a 1-bit flag.

An embodiment of the specification provides an intra-prediction-based encoding apparatus, comprising: acquiring module, to acquire reconstructed pixels adjacent to a to-be-predicted prediction block; prediction module, to determine corresponding reconstructed pixels adjacent to the to-be-predicted prediction block among the reconstructed pixels as reference pixels for filtering, based on prediction modes of the to-be-predicted prediction block; based on the reference pixels, use a filter corresponding to the prediction modes of the to-be-predicted prediction block to filter interim prediction values of the to-be-predicted prediction block, to obtain new pixel values of the to-be-predicted prediction block, wherein the interim prediction values are obtained based on other intra prediction methods; perform a CLIP operation on the new pixel values of the to-be-predicted prediction block, to obtain a first prediction value of the to-be-predicted prediction block.

An embodiment of the specification provides an intra-prediction-based decoding method, and the method comprises: acquiring reconstructed pixels adjacent to a to-be-predicted prediction block; determining corresponding reconstructed pixels adjacent to the to-be-predicted prediction block among the reconstructed pixels as reference pixels for filtering, based on prediction modes of the to-be-predicted prediction block; based on the reference pixels, using a filter corresponding to the prediction modes of the to-be-predicted prediction block to filter interim prediction values of the to-be-predicted prediction block, to obtain new pixel values of the to-be-predicted prediction block, wherein the interim prediction values are obtained based on other intra prediction methods; performing a CLIP operation on the new pixel values of the to-be-predicted prediction block to obtain a reconstructed coding block.

Preferably, before the above method, the intra-prediction-based decoding method further comprises: reading a flag in the bitstream in which the to-be-predicted prediction block is located, to determine whether the decoder sider needs to perform filtering.

An embodiment of the specification provides an intra-prediction-based decoding apparatus, and the apparatus comprises: acquiring module, to acquire reconstructed pixels adjacent to a to-be-predicted prediction block; prediction module, to determine corresponding reconstructed pixels adjacent to the to-be-predicted prediction block among the reconstructed pixels as reference pixels for filtering, based on prediction modes of the to-be-predicted prediction block; based on the reference pixels, use a filter corresponding to the prediction modes of the to-be-predicted prediction block to filter interim prediction values of the to-be-predicted prediction block, to obtain new pixel values of the to-be-predicted prediction block, wherein the interim prediction values are obtained based on other intra prediction methods; perform a CLIP operation on the new pixel values of the to-be-predicted prediction block to obtain a reconstructed coding block.

An embodiment of the specification further provides a filter, and the filter is used for filtering in intra-prediction-based encoding and decoding processes.

At least one technical solution above used in the embodiments of the specification may achieve the following benefits:

In this invention, based on filtering techniques in the process of intra prediction, use a rate-distortion optimization strategy to determine whether there's a need for filtering, thereby alleviating the distortion problem in the process of intra prediction and improving prediction accuracy and coding efficiency of the intra prediction.

BRIEF DESCRIPTION OF THE DRAWINGS

In order to more clearly illustrate the embodiments of the specification or the technical solutions in the prior art, the drawings used in the embodiments or the prior art description will be briefly introduced below, and obviously, the drawings in the following description are only some of the embodiments described in the specification, and those skilled in the art may obtain other drawings according to these drawings without any creative work.

DETAILED DESCRIPTION OF EMBODIMENTS

In order to enable the skilled in the art to better understand the technical solutions in the specification, the technical solutions in the embodiments of the specification will be clearly and completely described below with reference to the figures of the embodiments of the specification, and obviously, the described embodiments are only parts of the embodiments of the present application, but not all. All other embodiments obtained by the skilled in the art based on the embodiments of the specification without any creative work shall fall within the scope of the present application.

Figure 1:
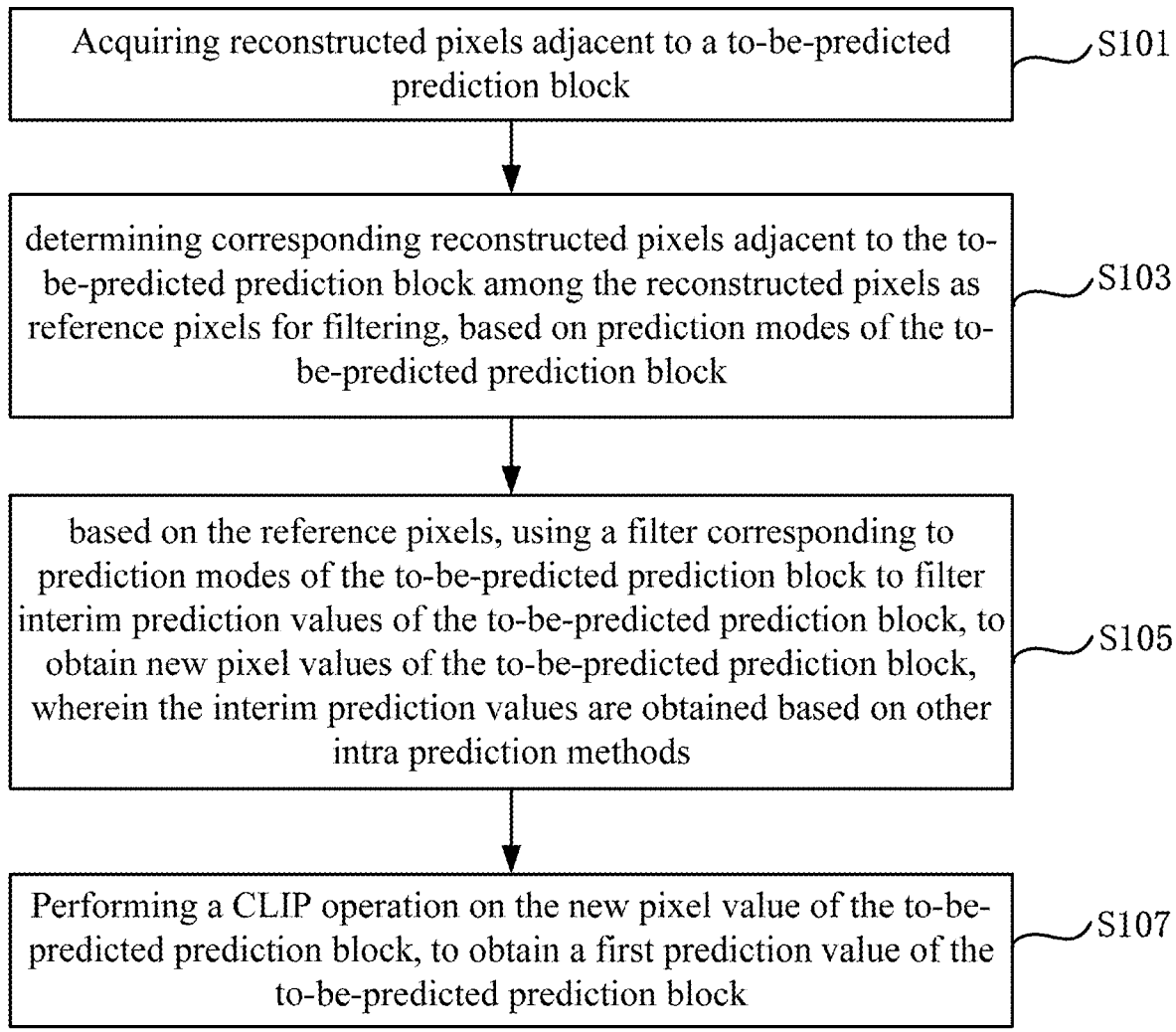
FIG. 1 illustrates an intra-prediction-based encoding method of an embodiment of the specification.

FIG. 1 illustrates an intra-prediction-based encoding method of an embodiment of the specification. The method specifically comprises:

S101: acquire reconstructed pixels adjacent to a to-be-predicted prediction block.

In an embodiment of the present application, intra prediction technique is used on the encoder sider to predict each prediction block. In the process of intra prediction, prediction is made in units of prediction blocks.

Since intra prediction conforms to a Z-scan order of coding, the left, left-above, above and right-above prediction blocks of the to-be-predicted prediction block all have been coded before coding the to-be-predicted prediction block. Therefore, prediction values of the pixels of the to-be-predicted prediction block may be derived from the left, left-above, above, and right-above reconstructed pixels of the to-be-predicted prediction block. In an embodiment of the present application, the reconstructed pixels adjacent to the to-be-predicted prediction block are the pixels obtained by encoding and decoding the adjacent prediction blocks. It should be noted that, when predicting the prediction block, whether to perform intra prediction or inter prediction on the prediction block is determined according to a rate-distortion optimization (RDO) technique.

S103: determine corresponding reconstructed pixels adjacent to the to-be-predicted prediction block among the reconstructed pixels as reference pixels for filtering, based on prediction modes of the to-be-predicted prediction block.

Figure 2:
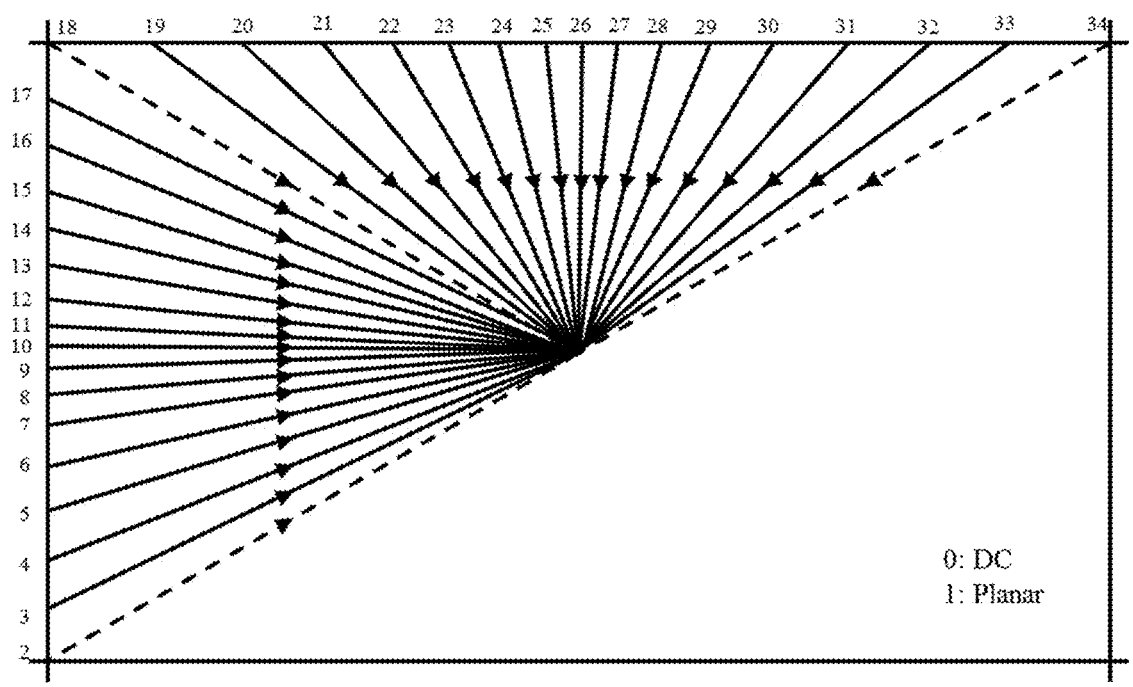
FIG. 2 is a schematic diagram of intra prediction modes in HEVC of an embodiment of the specification.

When performing other intra prediction processes on the to-be-predicted prediction block, HEVC (High Efficiency Video Coding) supports a total of 35 intra prediction modes, including DC mode, planar mode and 33 angular modes, to adaptively process different textures of prediction blocks. FIG. 2 is a schematic diagram of intra prediction modes of HEVC of an embodiment of the specification. Specifically, the intra prediction modes include a total of 35 modes 0-34, wherein mode 0 is the DC mode and mode 1 is the planar mode. In the present application, intra prediction modes between a diagonal down right (the dotted line) and a diagonal down left (the dotted line) are defined as a first type of prediction modes; intra prediction modes between a diagonal upper right (the dotted line) and a diagonal down right (the dotted line) are defined as a second type of prediction modes; and intra prediction modes other than the first type of prediction modes and the second type of prediction modes are defined as a third type of prediction modes. As for the intra prediction methods of HEVC, the first type of prediction modes include modes 18-34; the second type of prediction modes includes modes 2-17; and the third type of prediction modes includes the DC mode and the planar mode.

In the present application, determining reference pixels for filtering according to the intra prediction modes used in the process of intra prediction of the to-be-predicted prediction block, is specifically as follows: if the first type of prediction modes are used for intra prediction to predict the to-be-predicted prediction block, a column of reconstructed pixels to the left of the to-be-predicted prediction block are used as reference pixels for filtering; if the second type of prediction modes are used for intra prediction to predict the to-be-predicted prediction block, a row of reconstructed pixels above the to-be-predicted prediction block are used as reference pixels for filtering; if the third type of prediction modes are used for intra prediction to predict the to-be-predicted prediction block, a column of reconstructed pixels to the left of the to-be-predicted prediction block and a row of reconstructed pixels above the to-be-predicted prediction block are used as reference pixels for filtering.

S105: based on the reference pixels, use a filter corresponding to the prediction modes of the to-be-predicted prediction block to filter interim prediction values of the to-be-predicted prediction block, to obtain new pixel values of the to-be-predicted prediction block, wherein the interim prediction values are obtained based on other intra prediction methods.

In an embodiment of the present application, the interim prediction values of the to-be-predicted prediction block are interim results obtained by other intra prediction methods different from the intra prediction method of the present application, and the interim predicted values have not been operated by a CLIP operation.

In an embodiment of the present application, when the interim prediction values of the to-be-predicted prediction block are filtered, filters corresponding to the prediction modes of the to-be-predicted prediction block are used. It should be noted that the filters in the present application are filters for boundary filtering.

In an embodiment of the present application, a specially designed three-tap filter is used for the to-be-predicted prediction block. To avoid floating point calculation, the filter coefficients are converted to integers and scaled after filtering. Specifically, multiply the filter coefficient by 64 and round it up, and shift the prediction value to the right by 6 bits after filtering, which is expressed as Formula (1):

$$P(x,y)=(f(x) \cdot T(-1,y)+f(y) \cdot T(x,-1)+(64-f(x)-f(y)) \cdot T(x,y)+32)>>6 \quad \text{Formula(1)}$$

wherein $P(x, y)$ is a new pixel value of the to-be-predicted prediction block;

$T(x, y)$ is an interim prediction value of the to-be-predicted prediction block;

$T(-1, y)$ is a reference pixel value to the left of the to-be-predicted prediction block;

$T(x, -1)$ is a reference pixel value above the to-be-predicted prediction block;

x and y are coordinates in the predicted block to be predicted;

x=0 denotes the first column of the to-be-predicted prediction block;

y=0 denotes the first row of the to-be-predicted prediction block;

M denotes the width of the to-be-predicted prediction block;

N denotes the height of the to-be-predicted prediction block;

$f(x)$ denotes a filter coefficient of $T(-1, y)$;

$f(y)$ denotes a filter coefficient of $T(x, -1)$.

It should be noted that when $f(x)$ decays to zero, the filter degenerates into a two-tap filter, which is expressed as Formula (2):

$$P(x,y)=(f(y) \cdot T(x,-1)+(64-f(y)) \cdot T(x,y)+32)>>6 \quad \text{Formula (2);}$$

When f(y) decays to zero, the filter degenerates into a two-tap filter, which is expressed as Formula (3):

$$P(x,y)=(f(x)\cdot T(-1,y)+(64-f(x))\cdot T(x,y)+32)>>6 \quad \text{Formula (3).}$$

It should be noted that the filter used in an embodiment of the specification is applicable to different intra prediction modes, and specifically, if the first type of prediction modes are used in intra prediction to predict the to-be-predicted prediction block, a filter of Formula (3) is used to filter the interim prediction values of the to-be-predicted prediction block; if the second type of prediction modes are used for intra prediction to predict the to-be-predicted prediction block, a filter of Formula (2) is used to filter the interim prediction values of the to-be-predicted prediction block; if the third type of prediction modes are used for intra prediction to predict the to-be-predicted prediction block, a filter of Formula (1) is used to filter the interim prediction values of the to-be-predicted prediction block.

In an embodiment of the present application, the filter coefficients of the reference pixel are determined according to the width and the height of the to-be-predicted prediction block, and the filter coefficients are expressed as Formulas (4) and (5):

$$f(x)=FS[M][x] \quad \text{Formula (4)}$$

$$f(y)=FS[N][y] \quad \text{Formula (5)}$$

It should be noted that, in the present application, there are differences in the filter coefficients of prediction blocks with different sizes. Table 1 shows filter coefficients of embodiments of the present application.

TABLE 1

| Distance between the present pixel and the reference pixel | Size of the prediction block | | | | |
|---|---|---|---|---|---|
| | 4 | 8 | 12 | 32 | 64 |
| 0 | 24 | 44 | 40 | 36 | 52 |
| 1 | 6 | 25 | 27 | 27 | 44 |
| 2 | 2 | 14 | 19 | 21 | 37 |
| 3 | 0 | 8 | 13 | 16 | 31 |
| 4 | 0 | 4 | 9 | 12 | 26 |
| 5 | 0 | 2 | 6 | 9 | 22 |
| 6 | 0 | 1 | 4 | 7 | 18 |
| 7 | 0 | 1 | 3 | 5 | 15 |
| 8 | 0 | 0 | 2 | 4 | 13 |
| 9 | 0 | 0 | 1 | 3 | 11 |

In the present application, the CLIP operation is expressed as Formula (6):

$$CLIP(i,j,x) = \begin{cases} i, & x < i \\ j, & x > j \\ x, & i \le x \le j \end{cases} \quad \text{Formula (6)}$$

wherein, i denotes a lower limit of a defined range, and j denotes an upper limit of the defined range.

S107: perform a CLIP operation on the new pixel values of the to-be-predicted prediction block, to obtain a first prediction value of the to-be-predicted prediction block.

By using the intra-prediction-based encoding method of the embodiment of the specification, accuracy of intra prediction can be improved, and thereby coding efficiency can be improved.

In an embodiment of the specification, the above intra-prediction-based encoding method further includes: comparing the first prediction value of the to-be-predicted prediction block with a second prediction value of the to-be-predicted prediction block obtained by the other intra prediction methods, so as to obtain a prediction value of the to-be-predicted prediction block, and to output a flag to the bitstream in which the to-be-predicted prediction block is located.

Specifically, in the present application, a rate-distortion optimization strategy is used to compare the first prediction value with the second prediction value of the to-be-predicted prediction block, and choose the one with a smaller rate distortion cost as the prediction value of the to-be-predicted prediction block. It should be noted that, the second prediction value of the to-be-predicted prediction block is obtained based on the other intra prediction methods and has been operated by a CLIP operation. It should be noted that the intra prediction methods used for the first prediction value and the second prediction value are different, and the other intra prediction methods are different from the intra prediction method of the present application.

After the rate-distortion optimization, the prediction values of to-be-predicted prediction block are obtained, and at the same time, the bitstream in which the to-be-predicted prediction block is located needs to be marked. It should be noted that the flag is used to mark whether the to-be-predicted prediction block is to be filtered. In a specific implementation process, a 1-bit flag may be used.

Figure 3:
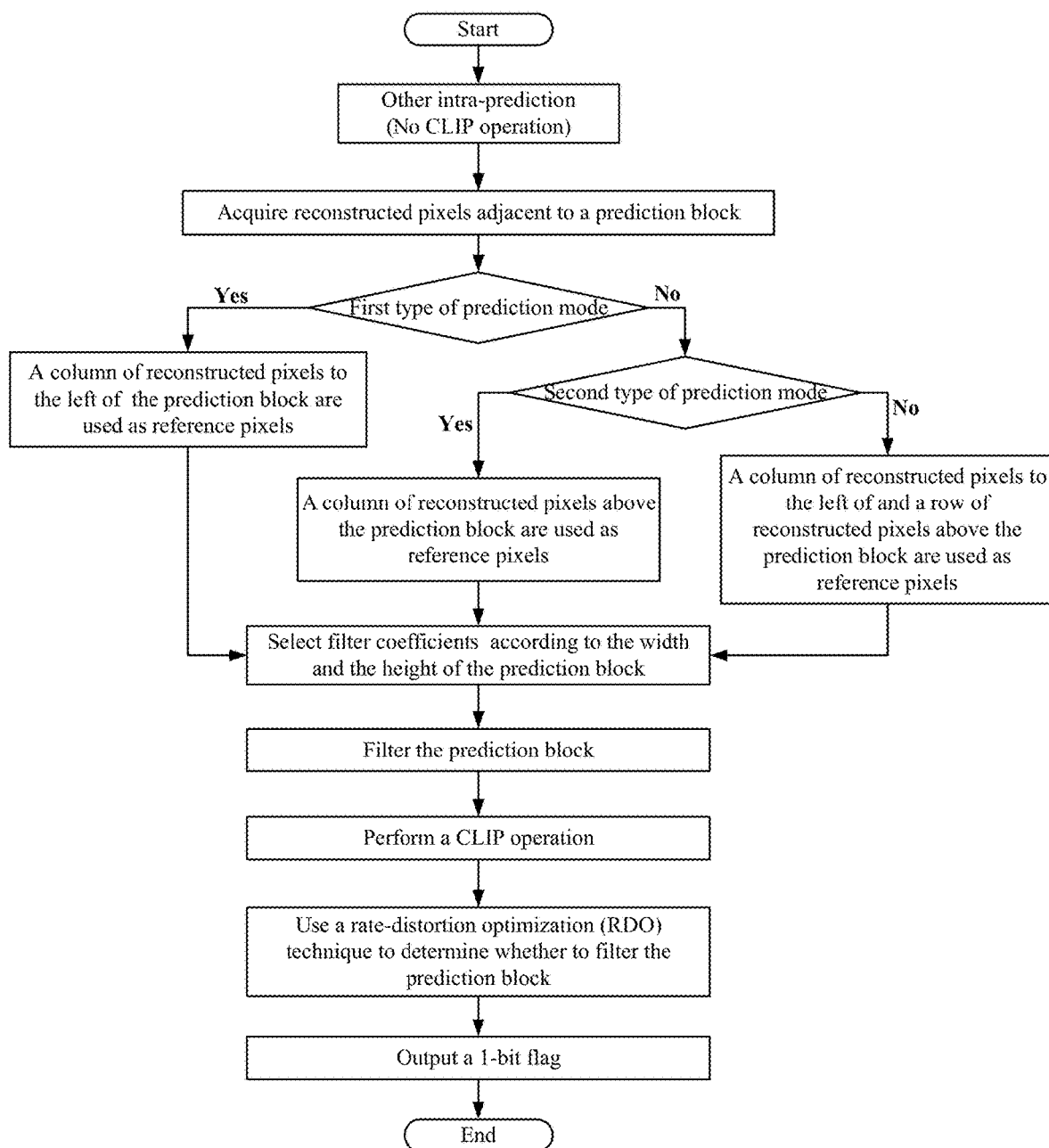
FIG. 3 is a flowchart of encoding a prediction block in the process of intra prediction according to an embodiment of the specification.

To further understand the encoding method shown in FIG. 1, FIG. 3 shows a flowchart of encoding a prediction block in the process of intra prediction according to an embodiment of the specification.

By using the intra-prediction-based encoding method of embodiments of the specification, the distortion problem in the process of intra prediction can be improved, and prediction accuracy and coding efficiency of intra prediction are improved.

Based on the same idea, the specification further provides an intra-prediction-based encoding apparatus, and the apparatus specifically comprises: acquiring module, to acquire reconstructed pixels adjacent to a to-be-predicted prediction block; prediction module, to determine corresponding reconstructed pixels adjacent to the to-be-predicted prediction block among the reconstructed pixels as reference pixels for filtering, based on prediction modes of the to-be-predicted prediction block; based on the reference pixels, use a filter corresponding to the prediction modes of the to-be-predicted prediction block to filter interim prediction values of the to-be-predicted prediction block, to obtain new pixel values of the to-be-predicted prediction block, wherein the interim prediction values are obtained based on other intra prediction methods; perform a CLIP operation on the new pixel values of the to-be-predicted prediction block, to obtain a first prediction value of the to-be-predicted prediction block.

Based on the same idea, there needs decoding after encoding for the prediction block, the specification provides an intra-prediction-based decoding method, and the method specifically comprises: acquiring reconstructed pixels adjacent to a to-be-predicted prediction block; determining corresponding reconstructed pixels adjacent to the to-be-predicted prediction block among the reconstructed pixels as reference pixels for filtering, based on prediction modes of the to-be-predicted prediction block; based on the reference pixels, using a filter corresponding to the prediction modes of the to-be-predicted prediction block to filter interim prediction values of the to-be-predicted prediction block, to obtain new pixel values of the to-be-predicted prediction block, wherein the interim prediction values are obtained based on other intra prediction methods; performing a CLIP operation on the new pixel values of the to-be-predicted prediction block to obtain a reconstructed coding block.

Figure 4:
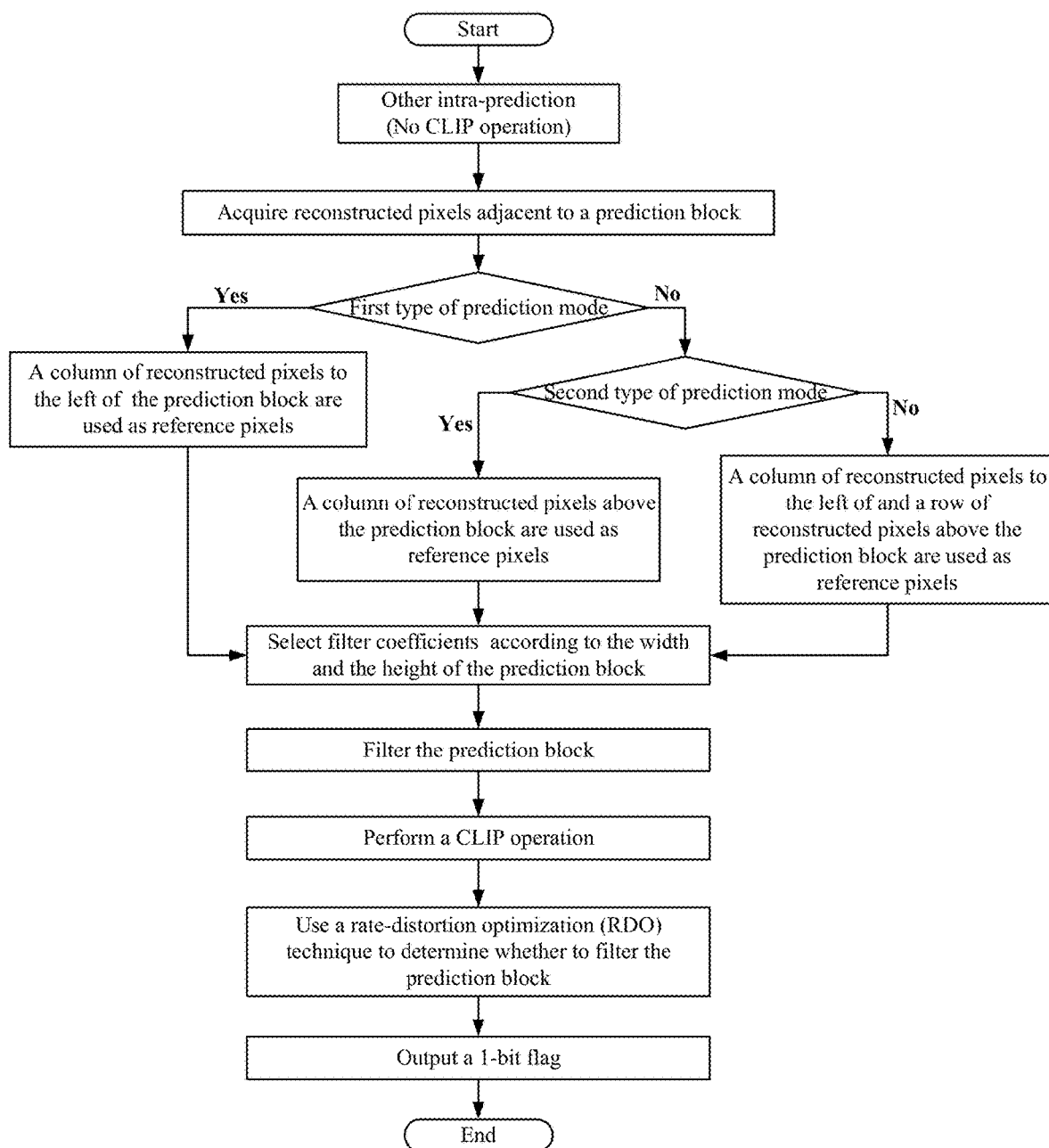
FIG. 4 is a flowchart of decoding a prediction block in the process of intra prediction according to an embodiment of the specification.

In an embodiment of the specification, on the decoder sider, read a flag in the bitstream in which the to-be-predicted prediction block is located, decode according to the flag, and determine whether the decoder sider needs to perform filtering. If the to-be-predicted prediction block needs to be filtered, the above intra-prediction-based decoding method is used for decoding. If the to-be-predicted prediction block does not need to be filtered, other decoding methods are used for decoding. To further understand the decoding method of the prediction block, FIG. 4 shows a flowchart of decoding a prediction block in the process of intra prediction according to an embodiment of the specification.

Based on the same idea, the specification provides an intra-prediction-based decoding apparatus, and the apparatus specifically comprises: acquiring module, to acquire reconstructed pixels adjacent to a to-be-predicted prediction block; prediction module, to determine corresponding reconstructed pixels adjacent to the to-be-predicted prediction block among the reconstructed pixels as reference pixels for filtering, based on prediction modes of the to-be-predicted prediction block; based on the reference pixels, use a filter corresponding to the prediction modes of the to-be-predicted prediction block to filter interim prediction values of the to-be-predicted prediction block, to obtain new pixel values of the to-be-predicted prediction block, wherein the interim prediction values are obtained based on other intra prediction methods; perform a CLIP operation on the new pixel values of the to-be-predicted prediction block to obtain a reconstructed coding block.

The specification further provides a filter for filtering in encoding and decoding processes of intra prediction.

The specific embodiments of the specification have been described above. Other embodiments are within the scope of the appended claims. In some cases, the actions or steps recited in the claims may be performed in a different order than in the embodiments and may still achieve desired results. In addition, the processes depicted in the figures are not necessarily required to achieve the desired results only in the particular order as shown. In some embodiments, multitasking and parallel processing are also possible or may be advantageous.

The various embodiments in the specification are described in a progressive manner, and the same similar parts between the various embodiments may be referred to each other, and each embodiment focuses on the differences from the other embodiments. In particular, as for the embodiments of the apparatus, the electronic apparatus, and the non-volatile computer storage medium, since they are basically similar to the method embodiment, the descriptions thereof are relatively simple, and the relevant parts may be referred to the description of the method embodiment.

The apparatus, the electronic apparatus, the non-volatile computer storage medium and the method provided by the embodiments of the specification are corresponding, and therefore, the apparatus, the electronic apparatus, and the non-volatile computer storage medium also have similar beneficial technical effects as the corresponding methods. Since the beneficial technical effects of the method have been described in detail above, the beneficial technical effects of the corresponding apparatus, the electronic apparatus, and the non-volatile computer storage medium will not be described herein.

In the 1990s, it was clear that improvements to a technology were improvements to hardware (for example, improvements to circuit structures such as diodes, transistors, switches, etc.) or improvements to software (improvements to process flow). However, with the development of technology, many of the improvements to process flow may now be considered as direct improvements to the hardware circuit structure. Designers always get corresponding hardware circuit structure by programming the improved process flow into the hardware circuit. Therefore, it cannot say that an improvement of process flow cannot be implemented with hardware entity modules. For example, a Programmable Logic Device (PLD) (such as a Field Programmable Gate Array (FPGA)) is an integrated circuit whose logic function is determined by programming the device by a user. Designers programmatically "integrate" a digital system onto a single PLD without having to ask the chip manufacturer to design and fabricate a dedicated integrated circuit chip. Moreover, today, instead of manually making integrated circuit chips, the programming is mostly implemented by using "logic compiler" software, which is similar to the software compiler used in programming development, and the original code to be compiled also needs to be written in a specific programming language called Hardware Description Language (HDL), and there is not just one kind of HDL, but many kinds of HDL, such as BEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc., wherein VHDL (Very-High-Speed Integrated Circuit Hardware Description Language) and Verilog are the most commonly used. It should also be clear to those skilled in the art that, the hardware circuit that implements the logic process flow may be easily got only by using above hardware description languages to logically program the process flow and to program the process flow into the integrated circuit.

A controller may be implemented in any suitable manner, for example, the controller may take a form of, for example, a microprocessor or a processor, a computer readable medium storing the computer readable program code (for example, software or firmware) executable by the (micro) processor, logic gates, switches, Application Specific Integrated Circuit (ASIC), programmable logic controllers and embedded microcontrollers, and examples of the controllers include but not limited to the following microcontrollers: ARC 625D, Atmel AT91SAM, Microchip PIC18F26K20 and Silicone Labs C8051F320, and a memory controller may also be implemented as a part of the control logic of a memory. It is known to those skilled in the art that, in addition to implement the controller by the way of purely computer readable program code, it is entirely possible to implement the same function in a form of logic gates, switches, Application Specific Integrated Circuit (ASIC), programmable logic controllers, embedded microcontrollers, etc., by logically programming the method steps. Therefore, such a controller may be considered as a hardware component, and apparatuses included therein for implementing various functions may also be regarded as structures within the hardware component. Or even, apparatuses used to implement various functions may be regarded as software modules of implementation method and structures within the hardware component.

The system, apparatus, module or unit illustrated in the above embodiments may be implemented by a computer chip or an entity, or by a product with a certain function. A typical implementation device is a computer. Specifically, the computer may be, for example, a personal computer, a laptop, a cellular phone, a camera phone, a smart phone, a personal digital assistant, a media player, a navigation device, an email device, a gaming console, a tablet, a wearable device, or a combination of any devices from above.

For the convenience of description, the above apparatuses are described as different units according to the functions thereof respectively. Of course, when one or more embodiments of the specification are implemented, the functions of the units may be implemented in one or more software and/or hardware.

Those skilled in the art will understand that an embodiment of the specification may be provided as method, system or products of computer programs. Therefore, an embodiment of the specification may take the form of an entirely hardware embodiment, an entirely software embodiment, or an embodiment combining software and hardware. Also, an embodiment of the specification may take the form of a product of computer program embodied on one or more computer usable storage media (including but not limited to disk storage, CD-ROM, optical storage, etc.) having computer usable program code embodied therein.

The present description is described in terms of flowcharts and/or block diagrams of a methods, devices (systems), and computer program products according to embodiments of the specification. It should be understood that each flow and/or block of the flowcharts and/or block diagrams, and combinations of flows and/or blocks in the flowcharts and/or block diagrams may be implemented by computer program instructions. These computer program instructions may be provided to a processor of a general purpose computer, a special purpose computer, an embedded processor, or other programmable data processing device to produce a machine, and thus, instructions executed by a processor of a computer or other programmable data processing device generate devices for implementing the functions specified in one flow or more flows of the flowcharts or one block or more blocks of the block diagrams.

The computer program instructions may also be stored in a computer readable memory that may direct a computer or other programmable data processing device to operate in a particular manner, such that the instructions stored in the computer readable memory produce an article of manufacture comprising an instruction device that implements the functions specified in a flow or more flows in flowcharts and/or a block or more blocks in block diagrams.

These computer program instructions may also be loaded onto a computer or other programmable data processing device such that a series of operational steps are performed on a computer or other programmable devices to produce computer-implemented processing, and therefore instructions executed on a computer or other programmable device provide steps for implementing the functions specified in a flow or more flows in flowcharts and/or a block or more blocks in block diagrams.

In a typical configuration, the computing device includes one or more processors (CPUs), input/output interfaces, network interfaces, and memory.

The memory may include a form of a non-persistent memory, a random access memory (RAM), and/or a non-volatile memory in a computer readable medium, such as a read-only memory (ROM) or a flash memory (Flash RAM). Memory is an example of a computer readable medium.

The computer readable medium includes both permanent and non-permanent media, removable and non-removable media, and the information may be stored by any method or technology. Information may be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disc-read only memory (CD-ROM), digital versatile disk (DVD) or other optical storage, magnetic tape cartridges, magnetic tape storage or other magnetic storage devices or any other non-transportable media that may be used to store information that may be accessed by a computing device. As defined herein, the computer readable media does not include transitory media, such as modulated data signals and carrier waves.

It should also be noted that the terms "comprise" or "include" or any other variations thereof are intended to encompass a non-exclusive inclusion, lead to a process, a method, a commodity, or a device including a series of elements includes not only those elements but also other elements not explicitly listed, or inherent in the process, the method, the commodity, or the device. Without more restrictions, elements defined by the phrase "include/comprise a . . . " do not exclude the presence of additional identical elements in the process, the method, the commodity, or the device including the elements.

This description may be described in the general context of computer-executable instructions executed by a computer, such as a program module. Generally, program modules include routines, programs, objects, components, data structures, and the like that perform particular tasks or implement particular abstract data types. It is also possible to implement the specification in a distributed computing environment in which tasks are performed by remote processing devices that are connected through a communication network.

The various embodiments in the specification are described in a progressive manner, and the same or similar parts between the various embodiments may be referred to each other, and each embodiment focuses on the differences from other embodiments. In particular, for the system embodiment, since it is basically similar to the method embodiment, the description is relatively simple, and the corresponding parts may refer to the description of the method embodiment.

The aspects described above are only for the embodiments of the specification, and are not intended to limit this application. Various changes and variations may be made to the application by those skilled in the art. Any modifications, equivalents, improvements, etc. made within the spirit and principles of the present application are intended to be included within the scope of the claims of the present application.

We claim:

1. An intra-prediction-based encoding method, comprising:
acquiring reconstructed pixels adjacent to a to-be-predicted prediction block;
determining corresponding reconstructed pixels adjacent to the to-be-predicted prediction block among the reconstructed pixels as reference pixels for filtering, based on prediction modes of the to-be-predicted prediction block; if a first type of prediction modes are used for intra prediction to predict the to-be-predicted prediction block, a column of reconstructed pixels to the left of the to-be-predicted prediction block are used as reference pixels for filtering; if a second type of prediction modes are used for intra prediction to predict the to-be-predicted prediction block, a row of reconstructed pixels above the to-be-predicted prediction block are used as reference pixels for filtering; if a third type of prediction modes are used for intra prediction to predict the to-be-predicted prediction block, a column of reconstructed pixels to the left of the to-be-predicted prediction block and a row of reconstructed pixels above the to-be-predicted prediction block are used as reference pixels for filtering; the first type of prediction modes include modes 18-34, the filter degenerates into a two-tap filter, which is expressed as Formula (3): $P(x,y)=(f(x) \cdot T(-1,y)+(64-f(x)) \cdot T(x,y)+32)>>6$ Formula (3); the second type of prediction modes includes modes 2-17, the filter degenerates into a two-tap filter, which is expressed as Formula (2): $P(x,y)=(f(y) \cdot T(x,-1)+(64-f(y)) \cdot T(x,y)+32)>>6$ Formula (2); and the third type of prediction modes includes the DC mode and the planar mode, the filter is a three-tap filter, which is expressed as Formula (1): $P(x,y)=(f(x) \cdot T(-1,y)+f(y) \cdot T(x,-1)+(64-f(x)-f(y)) \cdot T(x,y)+32)>>6$ Formula (1); wherein $P(x, y)$ is a new pixel value of the to-be-predicted prediction block; $T(x, y)$ is an interim prediction value of the to-be-predicted prediction block; $T(-1, y)$ is a reference pixel value to the left of the to-be-predicted prediction block; $T(x, -1)$ is a reference pixel value above the to-be-predicted prediction block; x and y are coordinates in the predicted block to be predicted; x=0 denotes the first column of the to-be-predicted prediction block; y=0 denotes the first row of the to-be-predicted prediction block; M denotes the width of the to-be-predicted prediction block; N denotes the height of the to-be-predicted prediction block; $f(x)$ denotes a filter coefficient of $T(-1, y)$; $f(y)$ denotes a filter coefficient of $T(x, -1)$;

based on the reference pixels, using a filter corresponding to prediction modes of the to-be-predicted prediction block to filter interim prediction values of the to-be-predicted prediction block, to obtain new pixel values of the to-be-predicted prediction block, wherein the interim prediction values are obtained based on other intra prediction methods; the filter coefficients are expressed as Formulas (4) and (5):

$f(x)=FS[M][x]$  Formula (4)

$f(y)=FS[N][y]$  Formula (5)

wherein FS are filter coefficients;
performing a CLIP operation on the new pixel values of the to-be-predicted prediction block, to obtain a first prediction value of the to-be-predicted prediction block.

2. The method of claim 1, further comprising:
comparing the first prediction value of the to-be-predicted prediction block with a second prediction value of the to-be-predicted prediction block obtained by the other intra prediction methods, so as to obtain a prediction value of the to-be-predicted prediction block, and to output a flag to the bitstream in which the to-be-predicted prediction block is located, and wherein the second prediction value has been operated by a CLIP operation, and the flag is used to mark whether the to-be-predicted prediction is to be filtered.

3. The method of claim 1, the acquiring reconstructed pixels adjacent to a to-be-predicted prediction block, specifically comprises:
decoding the coded prediction blocks adjacent to the to-be-predicted prediction block, to obtain the reconstructed pixels adjacent to the to-be-predicted prediction block.

4. The method of claim 1, the based on the reference pixels, using a filter corresponding to the prediction modes of the to-be-predicted prediction block, specifically comprises:
determining filter coefficients of the reference pixels according to the width and the height of the to-be-predicted prediction block;
using a filter corresponding to intra prediction modes of the to-be-predicted prediction block, based on the reference pixels and the filter coefficients.

5. The method of claim 1, the using a filter corresponding to the prediction modes of the to-be-predicted prediction block to filter interim prediction values of the to-be-predicted prediction block, specifically comprises;
if the first type of prediction modes are used for intra prediction to predict the to-be-predicted prediction block, a filter of Formula (3) is used to filter the interim prediction values of the to-be-predicted prediction block;
if the second type of prediction modes are used for intra prediction to predict the to-be-predicted prediction block, a filter of Formula (2) is used to filter the interim prediction values of the to-be-predicted prediction block; if the third type of prediction modes are used for intra prediction to predict the to-be-predicted prediction block, a filter of Formula (1) is used to filter the interim prediction values of the to-be-predicted prediction block.

6. The method of claim 1, the CLIP operation is expressed as Formula (6):

$$\text{CLIP}(i, j, x) = \begin{cases} i, x < i \\ j, x > j \\ x, i \le x \le j \end{cases} \quad \text{Formula (6)}$$

wherein i denotes a lower limit of a defined range, j denotes an upper limit of the defined range.

7. The method of claim 2, the flag is a 1-bit flag.

8. An intra-prediction-based encoding apparatus, comprising:
acquiring module, to acquire reconstructed pixels adjacent to a to-be-predicted prediction block;
prediction module, to determine corresponding reconstructed pixels adjacent to the to-be-predicted prediction block among the reconstructed pixels as reference pixels for filtering, based on prediction modes of the to-be-predicted prediction block; if a first type of prediction modes are used for intra prediction to predict the to-be-predicted prediction block, a column of reconstructed pixels to the left of the to-be-predicted prediction block are used as reference pixels for filtering; if a second type of prediction modes are used for intra prediction to predict the to-be-predicted prediction block, a row of reconstructed pixels above the to-be-predicted prediction block are used as reference pixels for filtering; if a third type of prediction modes are used for intra prediction to predict the to-be-predicted prediction block, a column of reconstructed pixels to the left of the to-be-predicted prediction block and a row of reconstructed pixels above the to-be-predicted prediction block are used as reference pixels for filtering; the first type of prediction modes include modes 18-34, the filter degenerates into a two-tap filter, which is expressed as Formula (3): $P(x,y)=(f(x)\cdot T(-1,y)+(64-f(x))\cdot T(x,y)+32)>>6$ Formula (3); the second type of prediction modes includes modes 2-17, the filter degenerates into a two-tap filter, which is expressed as Formula (2): $P(x,y)=f(y)\cdot T(x,-1)+(64-f(y))\cdot T(x,y)+32)>>6$ Formula (2); and the third type of prediction modes includes the DC mode and the planar mode, the filter is a three-tap filter, which is expressed as Formula (1):

$$P(x,y)=f(x)\cdot T(-1,y)+f(y)\cdot T(x,-1)+(64-f(x)-f(y))\cdot T(x,y)+32)>>6 \text{ Formula (1)};$$

wherein $P(x, y)$ is a new pixel value of the to-be-predicted prediction block; $T(x, y)$ is an interim prediction value of the to-be-predicted prediction block; $T(-1, y)$ is a reference pixel value to the left of the to-be-predicted prediction block; $T(x, -1)$ is a reference pixel value above the to-be-predicted prediction block; x and y are coordinates in the predicted block to be predicted; x=0 denotes the first column of the to-be-predicted prediction block; y=0 denotes the first row of the to-be-predicted prediction block; M denotes the width of the to-be-predicted prediction block; N denotes the height of the to-be-predicted prediction block; $f(x)$ denotes a filter coefficient of $T(-1, y)$; $f(y)$ denotes a filter coefficient of $T(x, -1)$;

based on the reference pixels, use a filter corresponding to the prediction modes of the to-be-predicted prediction block to filter interim prediction values of the to-be-predicted prediction block, to obtain new pixel values of the to-be-predicted prediction block, wherein the interim prediction values are obtained based on other intra prediction methods; the filter coefficients are expressed as Formulas (4) and (5):

$$f(x)=FS[M][x] \quad \text{Formula (4)}$$

$$f(y)=FS[N][y] \quad \text{Formula (5)}$$

wherein FS are filter coefficients;

perform a CLIP operation on the new pixel values of the to-be-predicted prediction block, to obtain a first prediction value of the to-be-predicted prediction block.

9. An intra-prediction-based decoding method, comprising:

acquiring reconstructed pixels adjacent to a to-be-predicted prediction block;

determining corresponding reconstructed pixels adjacent to the to-be-predicted prediction block among the reconstructed pixels as reference pixels for filtering, based on prediction modes of the to-be-predicted prediction block; if a first type of prediction modes are used for intra prediction to predict the to-be-predicted prediction block, a column of reconstructed pixels to the left of the to-be-predicted prediction block are used as reference pixels for filtering; if a second type of prediction modes are used for intra prediction to predict the to-be-predicted prediction block, a row of reconstructed pixels above the to-be-predicted prediction block are used as reference pixels for filtering; if a third type of prediction modes are used for intra prediction to predict the to-be-predicted prediction block, a column of reconstructed pixels to the left of the to-be-predicted prediction block and a row of reconstructed pixels above the to-be-predicted prediction block are used as reference pixels for filtering; the first type of prediction modes include modes 18-34, the filter degenerates into a two-tap filter, which is expressed as Formula (3): $P(x,y)=(f(x)\cdot T(-1,y)+(64-f(x))\cdot T(x,y)+32)>>6$ Formula (3); the second type of prediction modes includes modes 2-17, the filter degenerates into a two-tap filter, which is expressed as Formula (2): $P(x,y)=(f(y)\cdot T(x,-1)+(64-f(y))\cdot T(x,y)+32)>>6$ Formula (2); and the third type of prediction modes includes the DC mode and the planar mode, the filter is a three-tap filter, which is expressed as Formula (1): $P(x,y)=(f(x)\cdot T(-1,y)+f(y)\cdot T(x,-1)+(64-f(x)-f(y))\cdot T(x,y)+32)>>6$ Formula (1); wherein $P(x, y)$ is a new pixel value of the to-be-predicted prediction block; $T(x, y)$ is an interim prediction value of the to-be-predicted prediction block; $T(-1, y)$ is a reference pixel value to the left of the to-be-predicted prediction block; $T(x, -1)$ is a reference pixel value above the to-be-predicted prediction block; x and y are coordinates in the predicted block to be predicted; x=0 denotes the first column of the to-be-predicted prediction block; y=0 denotes the first row of the to-be-predicted prediction block; M denotes the width of the to-be-predicted prediction block; N denotes the height of the to-be-predicted prediction block; $f(x)$ denotes a filter coefficient of $T(-1, y)$; $f(y)$ denotes a filter coefficient of $T(x, -1)$;

based on the reference pixels, using a filter corresponding to the prediction modes of the to-be-predicted prediction block to filter interim prediction values of the to-be-predicted prediction block, to obtain new pixel values of the to-be-predicted prediction block; the filter coefficients are expressed as Formulas (4) and (5):

$$f(x)=FS[M][x] \quad \text{Formula (4)}$$

$$f(y)=FS[N][y] \quad \text{Formula (5)}$$

wherein FS are filter coefficients;

performing a CLIP operation on the new pixel values of the to-be-predicted prediction block to obtain a reconstructed coding block.

10. The method of claim 9, wherein the intra-prediction-based decoding method further comprises: reading a flag in the bitstream in which the to-be-predicted prediction block is located, to determine whether the decoder sider needs to perform filtering.

11. An intra-prediction-based decoding apparatus, comprising:

acquiring module, to acquire reconstructed pixels adjacent to a to-be-predicted prediction block;

prediction module, to determine corresponding reconstructed pixels adjacent to the to-be-predicted prediction block among the reconstructed pixels as reference pixels for filtering, based on prediction modes of the to-be-predicted prediction block; if a first type of prediction modes are used for intra prediction to predict the to-be-predicted prediction block, a column of reconstructed pixels to the left of the to-be-predicted prediction block are used as reference pixels for filtering; if a second type of prediction modes are used for intra prediction to predict the to-be-predicted prediction block, a row of reconstructed pixels above the to-be-predicted prediction block are used as reference pixels for filtering; if a third type of prediction modes are used for intra prediction to predict the to-bepredicted prediction block, a column of reconstructed pixels to the left of the to-be-predicted prediction block and a row of reconstructed pixels above the to-be-predicted prediction block are used as reference pixels for filtering; the first type of prediction modes include modes 18-34, the filter degenerates into a two-tap filter, which is expressed as Formula (3): $P(x,y)=f(x) \cdot T(-1,y)+(64-f(x)) \cdot T(x,y)+32)>>6$ Formula (3); the second type of prediction modes includes modes 2-17, the filter degenerates into a two-tap filter, which is expressed as Formula (2): $P(x,y)=f(y) \cdot T(x,-1)+(64-f(y)) \cdot T(x,y)+32)>>6$ Formula (2); and the third type of prediction modes includes the DC mode and the planar mode, the filter is a three-tap filter, which is expressed as Formula (1): $P(x,y)=f(x) \cdot T(-1,y)+f(y) \cdot T(x,-1)+(64-f(x)-f(y)) \cdot T(x,y)+32)>>6$ Formula (1); wherein $P(x, y)$ is a new pixel value of the to-be-predicted prediction block; $T(x, y)$ is an interim prediction value of the to-be-predicted prediction block; $T(-1, y)$ is a reference pixel value to the left of the to-be-predicted prediction block; $T(x, -1)$ is a reference pixel value above the to-be-predicted prediction block; x and y are coordinates in the predicted block to be predicted; x=0 denotes the first column of the to-be-predicted prediction block; y=0 denotes the first row of the to-be-predicted prediction block; M denotes the width of the to-be-predicted prediction block; N denotes the height of the to-be-predicted prediction block; f(x) denotes a filter coefficient of $T(-1, y)$; f(y) denotes a filter coefficient of $T(x, -1)$;

based on the reference pixels, use a filter corresponding to the prediction modes of the to-be-predicted prediction block to filter interim prediction values of the to-be-predicted prediction block, to obtain new pixel values of the to-be-predicted prediction block; the filter coefficients are expressed as Formulas (4) and (5):

$$f(x)=FS[M][x] \qquad \text{Formula(4)}$$

$$f(y)=FS[N][y] \qquad \text{Formula(5)}$$

wherein FS are filter coefficients;

perform a CLIP operation on the new pixel values of the to-be-predicted prediction block to obtain a reconstructed coding block.

12. A filter, used for filtering in intra-prediction-based decoding apparatus according to claim 11.

* * * * *